(12) United States Patent
Temple, II

(10) Patent No.: US 7,835,142 B2
(45) Date of Patent: Nov. 16, 2010

(54) DISPLAY APPARATUS

(76) Inventor: Donald Lee Temple, II, 57 Hackleboro Rd., Canterbury, NH (US) 03224

( * ) Notice: Subject to any disclaimer, the term of this patent is extended or adjusted under 35 U.S.C. 154(b) by 356 days.

(21) Appl. No.: 11/827,815

(22) Filed: Jul. 13, 2007

(65) Prior Publication Data

US 2008/0024672 A1 Jan. 31, 2008

Related U.S. Application Data

(60) Provisional application No. 60/830,976, filed on Jul. 14, 2006.

(51) Int. Cl.
*H05K 5/00* (2006.01)

(52) U.S. Cl. .................. 361/679.01; 348/669
(58) Field of Classification Search ............ 361/679.01, 361/679.21, 679.26; 348/669; 359/601
See application file for complete search history.

(56) References Cited

U.S. PATENT DOCUMENTS

| | | | | |
|---|---|---|---|---|
| 5,069,529 A * | 12/1991 | Takahashi | ............... | 359/601 |
| 5,105,338 A * | 4/1992 | Held | ............... | 361/679.09 |
| 5,115,345 A * | 5/1992 | Hobson et al. | ............... | 359/601 |
| 5,121,253 A * | 6/1992 | Waintroob | ............... | 359/601 |
| 5,218,474 A * | 6/1993 | Kirschner | ............... | 359/601 |
| 5,233,468 A * | 8/1993 | McNulty | ............... | 359/601 |
| 5,243,463 A * | 9/1993 | Waintroob | ............... | 359/601 |
| 5,589,985 A * | 12/1996 | Heller et al. | ............... | 359/608 |
| 5,717,566 A * | 2/1998 | Tao | ............... | 361/679.27 |
| 5,877,896 A * | 3/1999 | Gremban | ............... | 359/601 |
| 5,900,979 A * | 5/1999 | Heller et al. | ............... | 359/609 |
| 5,966,241 A * | 10/1999 | Gilger | ............... | 359/609 |
| 5,988,823 A * | 11/1999 | Wong | ............... | 359/601 |
| 5,997,145 A * | 12/1999 | Mora | ............... | 359/609 |
| 6,065,841 A * | 5/2000 | Heller et al. | ............... | 359/609 |
| 6,084,711 A * | 7/2000 | Duff | ............... | 359/601 |
| 6,115,238 A * | 9/2000 | von Gutfeld | ............... | 361/679.26 |
| 6,144,418 A * | 11/2000 | Kappel et al. | ............... | 348/834 |
| 6,302,546 B1 * | 10/2001 | Kordiak | ............... | 359/608 |
| 6,356,439 B1 * | 3/2002 | Schmidt | ............... | 361/679.24 |
| 6,394,615 B1 * | 5/2002 | Hill et al. | ............... | 359/608 |
| 7,134,758 B1 * | 11/2006 | Baker | ............... | 359/601 |
| 7,303,077 B2 * | 12/2007 | Harlocker | ............... | 206/576 |
| 7,304,839 B1 * | 12/2007 | Burns | ............... | 361/679.55 |
| 2003/0223119 A1 * | 12/2003 | Heiman | ............... | 359/610 |
| 2006/0279916 A1 * | 12/2006 | Boudreau | ............... | 361/681 |

* cited by examiner

*Primary Examiner*—Lisa Lea-Edmonds
(74) *Attorney, Agent, or Firm*—Michelle Saquet Temple

(57) ABSTRACT

An apparatus including a base is disclosed. The base has a size and shape to accommodate at least a portion of a notebook computer. Also, an apparatus including a frame is disclosed. The frame having a size and, or shape to accommodate and frame at least a portion of a computer monitor, wherein the frame having at least one portion. Also, an apparatus including a base and a frame is disclosed. The base having at least one section and the base having a size and shape to accommodate at least a portion of a notebook computer. The frame portion is connected to the base. The connecting is detachable or permanent. The frame portion accommodates and frames at least a portion of a monitor of a notebook computer, and the frame portion has at least one section.

18 Claims, 15 Drawing Sheets

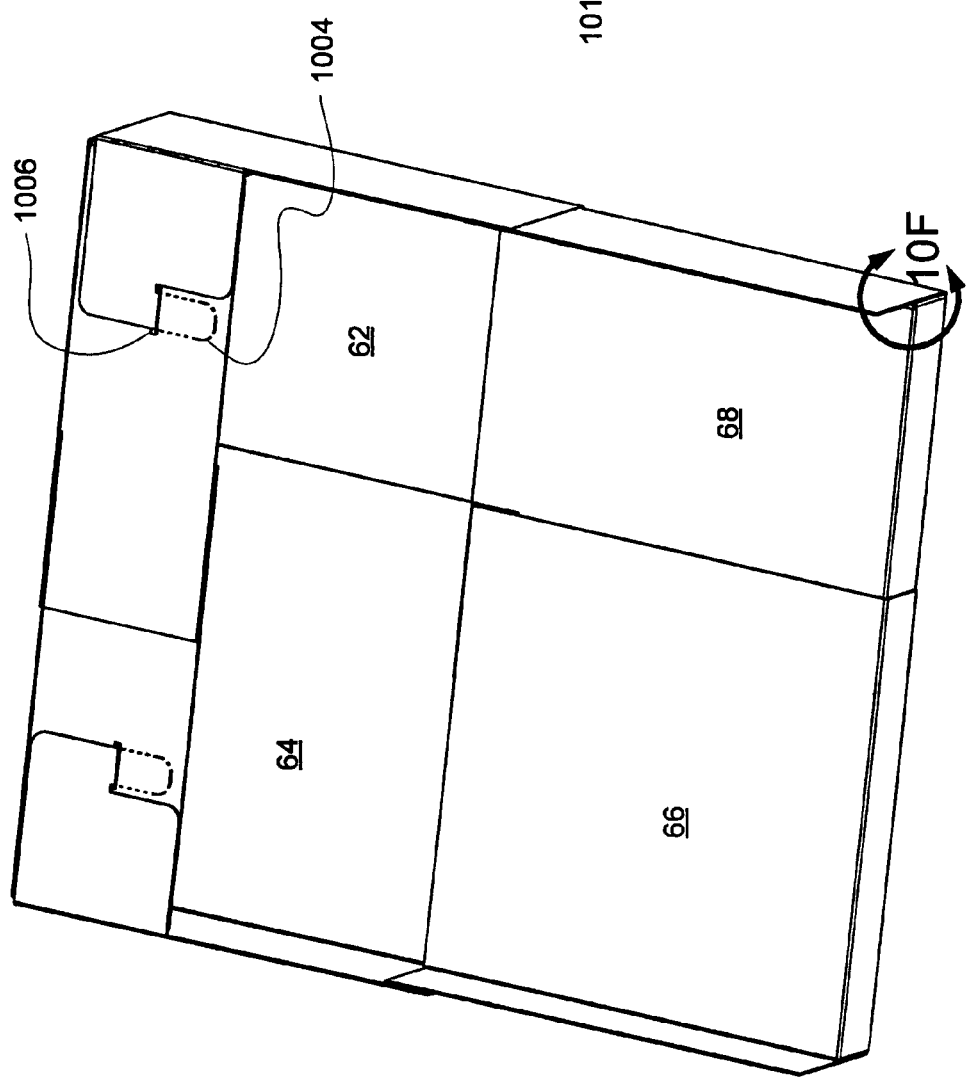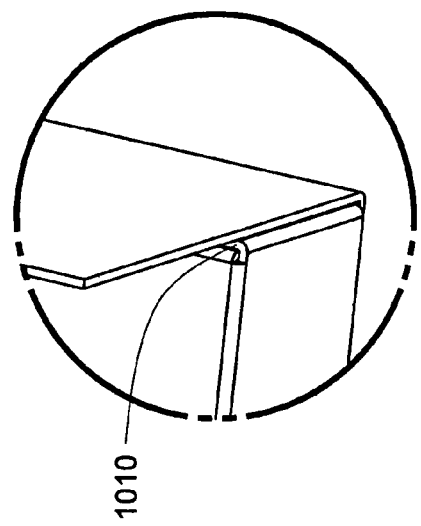

DISPLAY APPARATUS

RELATED APPLICATIONS

This application claims the benefit of provisional patent application Ser. No. 60/830,976 filed Jul. 14, 2006 which is incorporated herein by reference.

TECHNICAL FIELD

The present invention relates to presentation items, aides and materials, particularly, to a display apparatus.

BACKGROUND INFORMATION

It is frequently desirable to present exhibits and materials in a mass consumption environment such as a public space, tradeshow, classroom, science fair or the like. Frequently, these exhibits and materials include the use of a computer monitor to exhibit computer presentations which include, but are not limited to, a "slide show", series of pictures, videos or any other type of program or files capable of being displayed on a computer monitor. In addition, marketing items are often placed near the computer presentation/computer monitor for the consumer to take away. These marketing items include, but are not limited to, business cards, brochures, writing or highlighting instruments, key chains and other items.

Currently, a stand-alone computer monitor or display is used to exhibit these computer presentations. However, it is often inconvenient or impossible to use an external monitor for the presentation. In these cases it may be advantageous to exhibit the presentation on a notebook computer monitor. Accordingly, there is a need for an apparatus that enables the use of a notebook computer as a display device.

SUMMARY

In accordance with one aspect of the present invention, an apparatus having a base is disclosed. The base has a size and shape to accommodate at least a portion of a notebook computer.

Some embodiments of this aspect of the present invention include one or more of the following: wherein the base is collapsible, wherein the base is foldable, wherein the base size and, or shape is adjustable, wherein the base includes at least one section, wherein the base includes at least two sections, and, or wherein the base further includes a top tray portion. Some embodiments of this aspect of the invention further include wherein the top tray portion further includes at least one dividing feature, and wherein the at least one dividing feature is moveable.

Some further embodiments of this aspect of the present invention include wherein the base further includes a frame portion connected to the base, the frame portion having a predetermined size and, or shape so as to accommodate and frame a monitor of a notebook computer, wherein the frame portion having at least one section. Some further embodiments of this embodiment of the present invention include wherein the frame includes at least two portions. In some embodiments, the at least two portions connect to one another so as to form the frame. Also, in some further embodiments, at least two portions further include at least two connecting points whereby the size of the frame portion is adjustable.

In accordance with another aspect of the present invention, an apparatus including a frame is disclosed. The frame having a size and, or shape to accommodate and frame at least a portion of a computer monitor, wherein the frame having at least one portion.

Some embodiments of this aspect of the present invention include one or more of the following: wherein the frame connects to a base portion, and, or, wherein the frame includes at least two portions. Some embodiments of this embodiment further include wherein the at least two portions connect to one another so as to form the frame, wherein the at least two portions further include at least two connecting points whereby the size and, or shape of the frame portion is adjustable.

In accordance with another aspect of the present invention an apparatus including a base and a frame is disclosed. The base having at least one section and the base having a size and shape to accommodate at least a portion of a notebook computer. The frame portion is connected to the base. The connection can be detachable or permanent. The frame portion accommodates and frames at least a portion of a monitor of a notebook computer, and the frame portion has at least one section.

Some embodiments of this aspect of the present invention include one or more of the following: wherein the base and frame are collapsible and, or wherein the base and frame are foldable. In some embodiments, the base further includes a top tray portion. Some of these embodiments further include wherein the top tray portion further includes at least one dividing feature. Some of these embodiments additionally include wherein the at least one dividing feature is moveable.

Additionally, some embodiments of the base and frame apparatus include one or more of the following: wherein the base includes at least two sections; wherein the frame includes at least two portions. Some embodiments of this embodiment of the present invention further include wherein the at least two portions connect to one another so as to form the frame, wherein the at least two portions further include at least two connecting points whereby the size and, or shape of the frame portion is adjustable.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIG. 10E shows a bottom pictorial view of the embodiment shown in FIG. 10A.

FIG. 10F is a closeup view showing the interaction of a tab feature with other elements of the apparatus.

DETAILED DESCRIPTION OF THE PREFERRED EMBODIMENTS

An apparatus that accommodates a portion of a notebook computer is disclosed. The portion of the notebook computer includes the non-monitor portion of the notebook computer that typically includes the keyboard(s), CPU, and disc drive(s). However, in some embodiments, the apparatus can accommodate the entire notebook, in some embodiments, the apparatus includes a frame for the monitor as well as a portion to accommodate the non-monitor portion of the notebook computer, and in still other embodiments only the monitor portion of the notebook is used with the apparatus. The apparatus thus covers at least one portion of a notebook computer. The apparatus includes a top portion which, in some embodiments, includes partitions and/or apparatus and/or features for accommodating and/or partitioning and/or holding items including items used for marketing or business promotion purposes. One embodiment of the apparatus includes a housing or base having a portion to accommodate at least a portion of the non-display portion of the notebook computer. In some embodiments, the housing or base is collapsible or foldable onto itself. In other embodiments, the apparatus includes at least two portions, including a top or frame portion and a base portion, both portions fully collapsible and, or foldable. In some embodiments, a frame portion is also connected or attached to the base portion. The frame, in one embodiment, is part of the base portion, in another embodiments; the frame is a separate portion, capable of connecting or attaching to the base portion or the housing. The apparatus can be made from any material including, but not limited to, corrugated plastic, corrugated cardboard, fiber board, plastic, wood, metal, paper or any paper product, Styrofoam, or any other material capable of being formed into the described apparatus. In the preferred embodiment, the apparatus is made from corrugated plastic or fiberboard. The terms "monitor" and computer screen are interchangeable as used herein. The terms "connected" or "connect", etc, and "attached" or "attach" are also used interchangeably to represent a state of being where the parts touch, either permanently or fixedly or removably, so as to form a relationship for a period. In some embodiments, the base and frame are removably attached/connected, in other embodiments, the base and frame are permanently attached/connected.

The apparatus is described herein referring to multiple embodiment and features. Each of these features can be "mixed and matched" with other features to form a variety of embodiments. The figures shown herein are for description purposes only and because of the variety of features described, and the number of alternate embodiments is so numerous, figures are not meant to limit to number of alternate embodiments.

Figure 11:
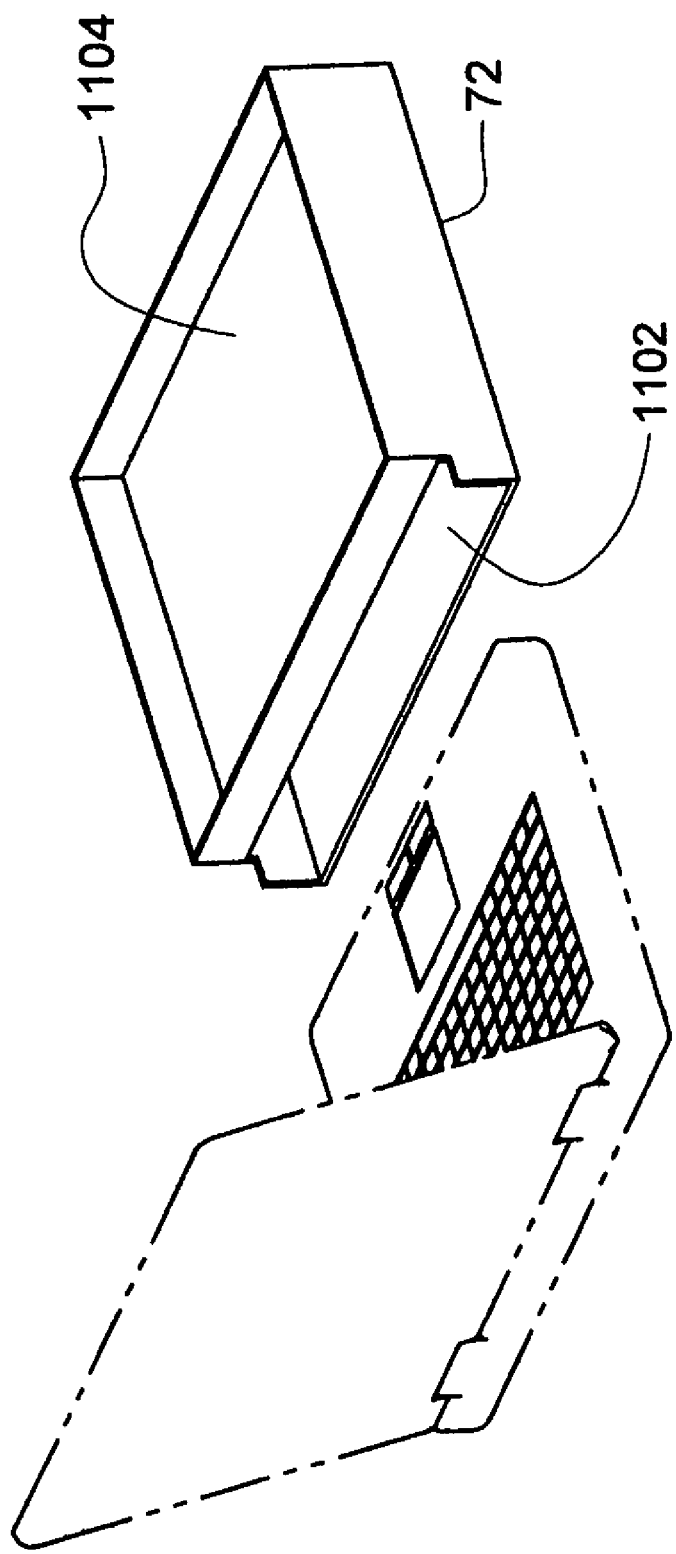
FIG. 11 shows an embodiment of the present invention that is rigid and not collapsible. It may be made of rigid material or assembled in such a way that it does not collapse.

Referring first to FIG. 11, one embodiment of the apparatus is shown. In the embodiment shown, the apparatus includes a housing having an opening 1102 along one side sized to accept at least a portion of a notebook computer. The embodiment includes a one piece housing 72. Although the housing is shown here with a one-compartment top 1104, in other embodiments, the top can include partitions and other foldable, non-foldable or attachable/connectable features, as shown in other embodiments of the apparatus.

Figure 1:
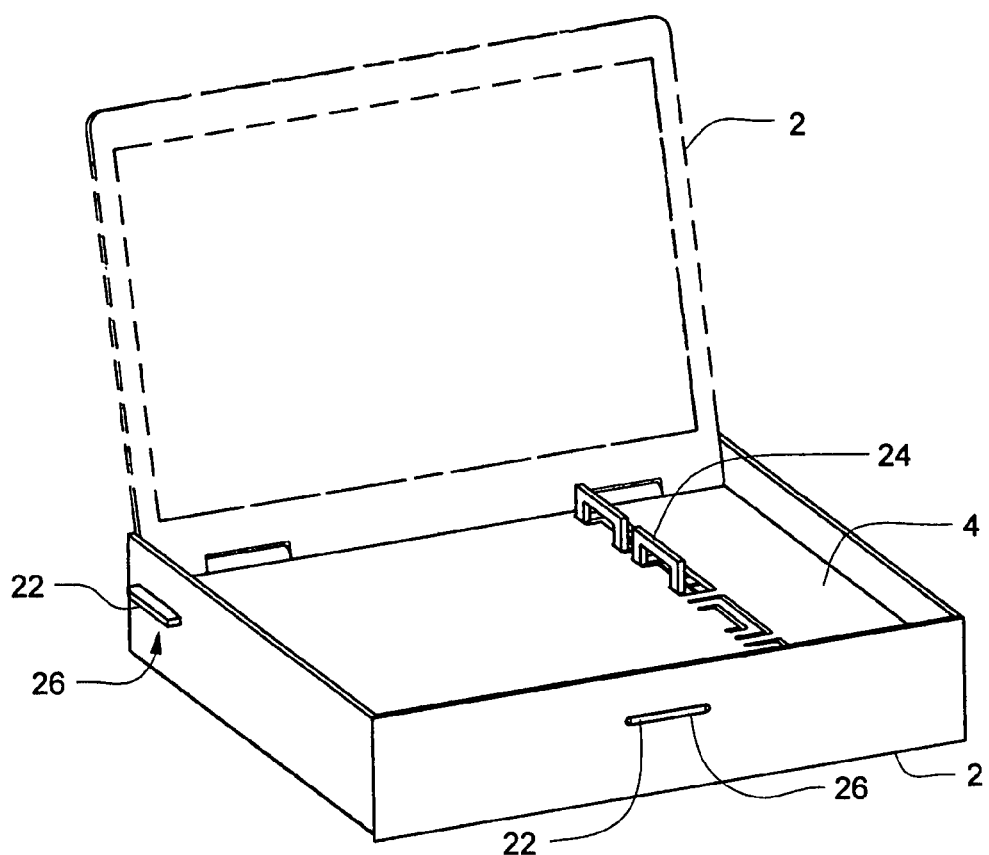
FIG. 1 is a pictorial view of one embodiment of the present invention in its assembled state on a notebook computer.

Referring now to FIG. 1, another embodiment of the apparatus is shown. In this embodiment, the apparatus includes a base 2 and a top 4. The base 2 and top 4 are assembled to form a housing with a tray surface. The housing accommodates at least a portion of a notebook computer 6. As shown in FIG. 1, the non-monitor portion of the notebook computer 6 is inside the apparatus. Base 2 and top 4 are configured such that they assembled together to form the apparatus. In the preferred embodiment the base 2 and top 4 are attached or connected by interlocking tabs 22 and corresponding slots 26. However, in other embodiments, the base 2 and top 4 are attached or connected by other means, including, but not limited to, a hook and loop mechanism, snaps, or any other means capable of attaching or connecting the base 2 and tray 4. The tray 4 may be contiguous or may have cutouts, slots, or other foldable or movable features 24 that enable the locating of any item that may be displayed in the tray area including but not limited to, product samples, brochures, business cards, promotional items or exhibits as desired by the user. Although one embodiment is shown in FIG. 1, in still other embodiments, the moveable tray features such as item 24 can take on other forms for various uses that will be apparent to one of ordinary skill in the art.

Figure 2:
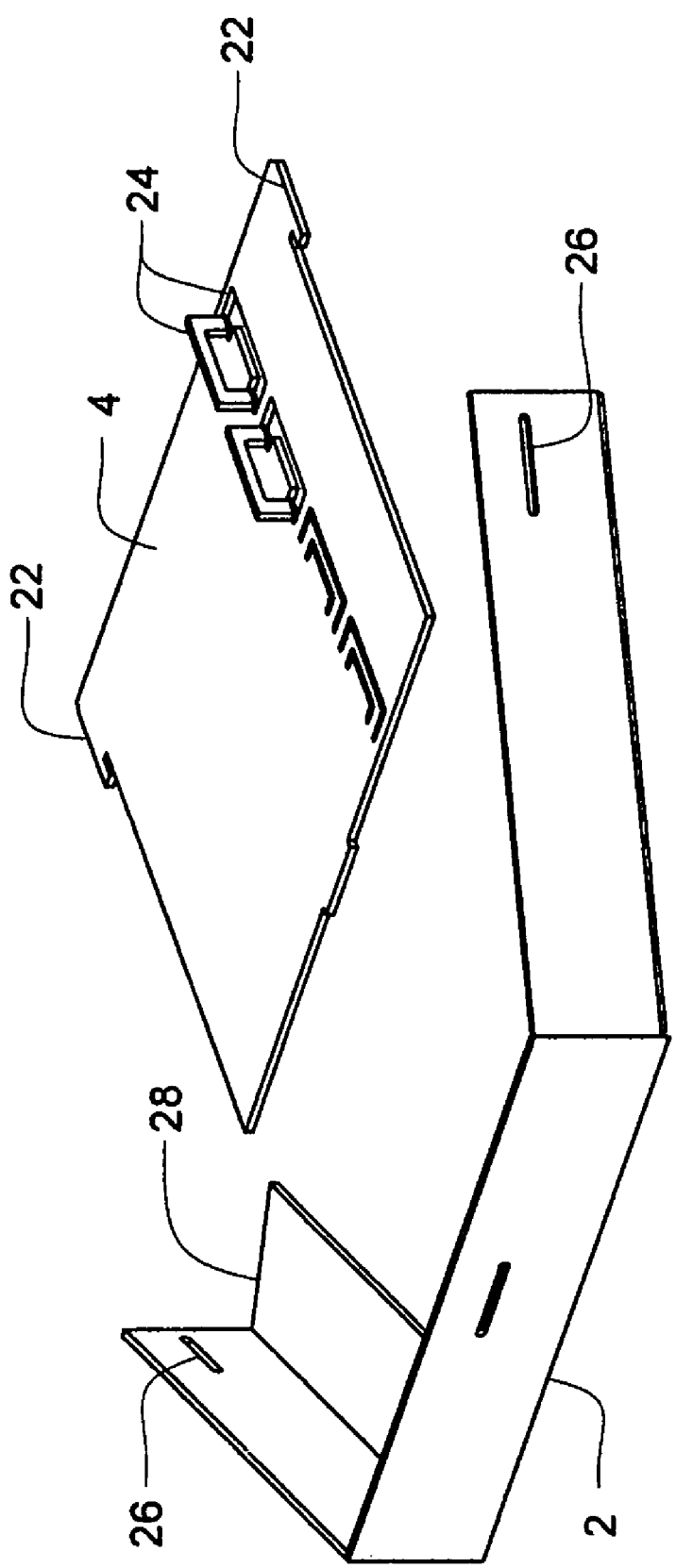
FIG. 2 is an exploded view of one embodiment of the present invention.

Referring now to FIG. 2 one embodiment of the apparatus 2 is shown in a partially assembled state. Here it is possible to see the slots 26 on the base 2 that are assembled with the tabs 22 of the tray 4. Flaps 28 may be provided on the base to fit under the notebook computer 6 to provide stability so the apparatus is not easily removed from the computer, i.e., the notebook computer 6 sitting on the flaps 28 provides a weight to the apparatus. As shown in FIG. 2, moveable features 24 are cut into the tray 4 to create optional partitions on the tray surface for the segregation of items displayed on the tray. The moveable features 24 can be placed in their open position to create customizable partitions in the tray 4.

Figure 3A:
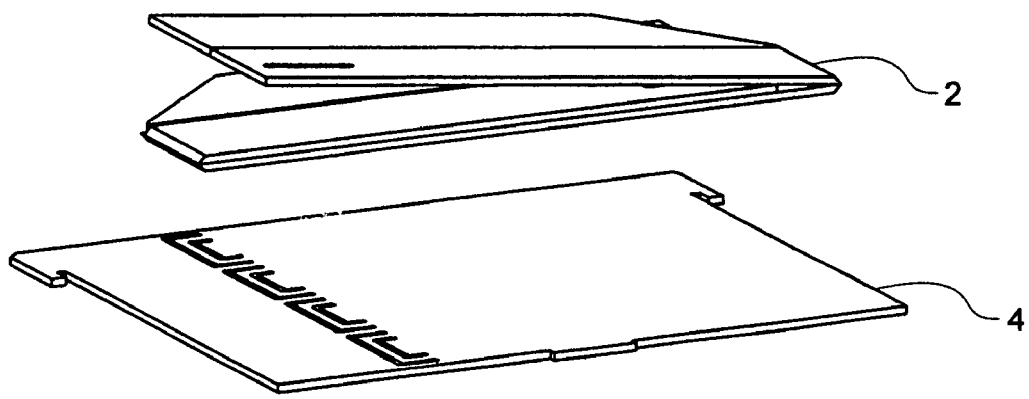
FIG. 3A shows one embodiment of the present invention in a semi-collapsed state.
Figure 3B:
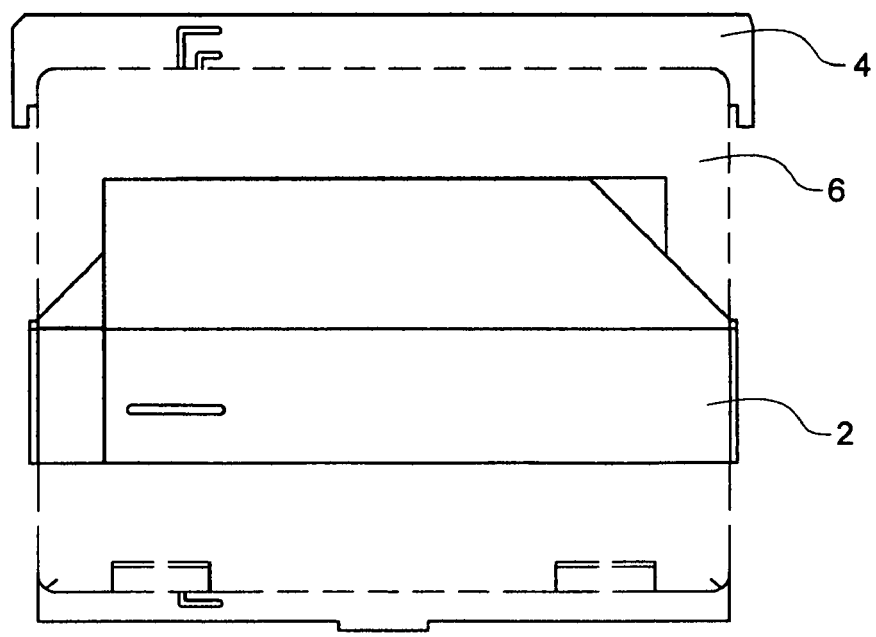
FIG. 3B is a top view of on embodiment of the invention stacked with a notebook computer.

Referring now to FIGS. 3A and 3B, the base 2 is shown in a collapsed state and ready to be stacked with the tray 4. Referring to only FIG. 3B, a top view of the base 2 is shown stacked on the notebook computer 6 and the tray 4.

Figure 4:
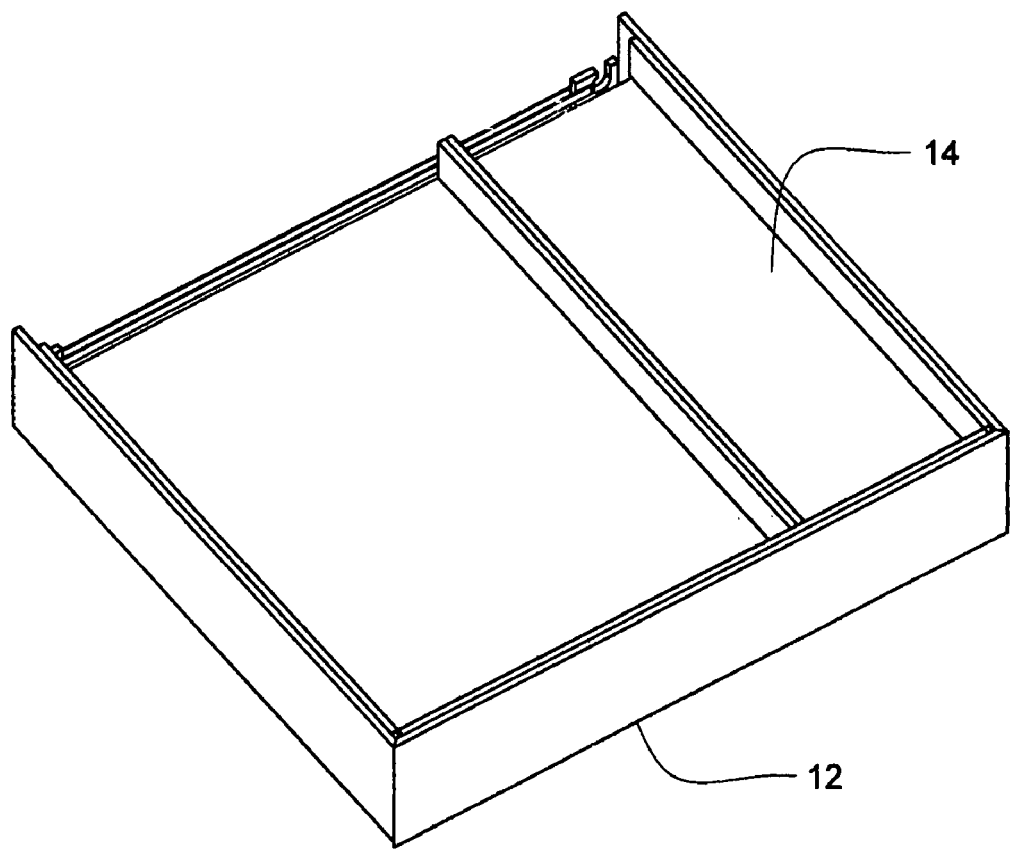
FIG. 4 is a pictorial view of an alternate embodiment of the present invention.

Referring now to FIG. 4, an alternate embodiment of the apparatus is shown. In this embodiment, the notebook computer is surrounded by a base 12 and tray 14.

Figure 5:
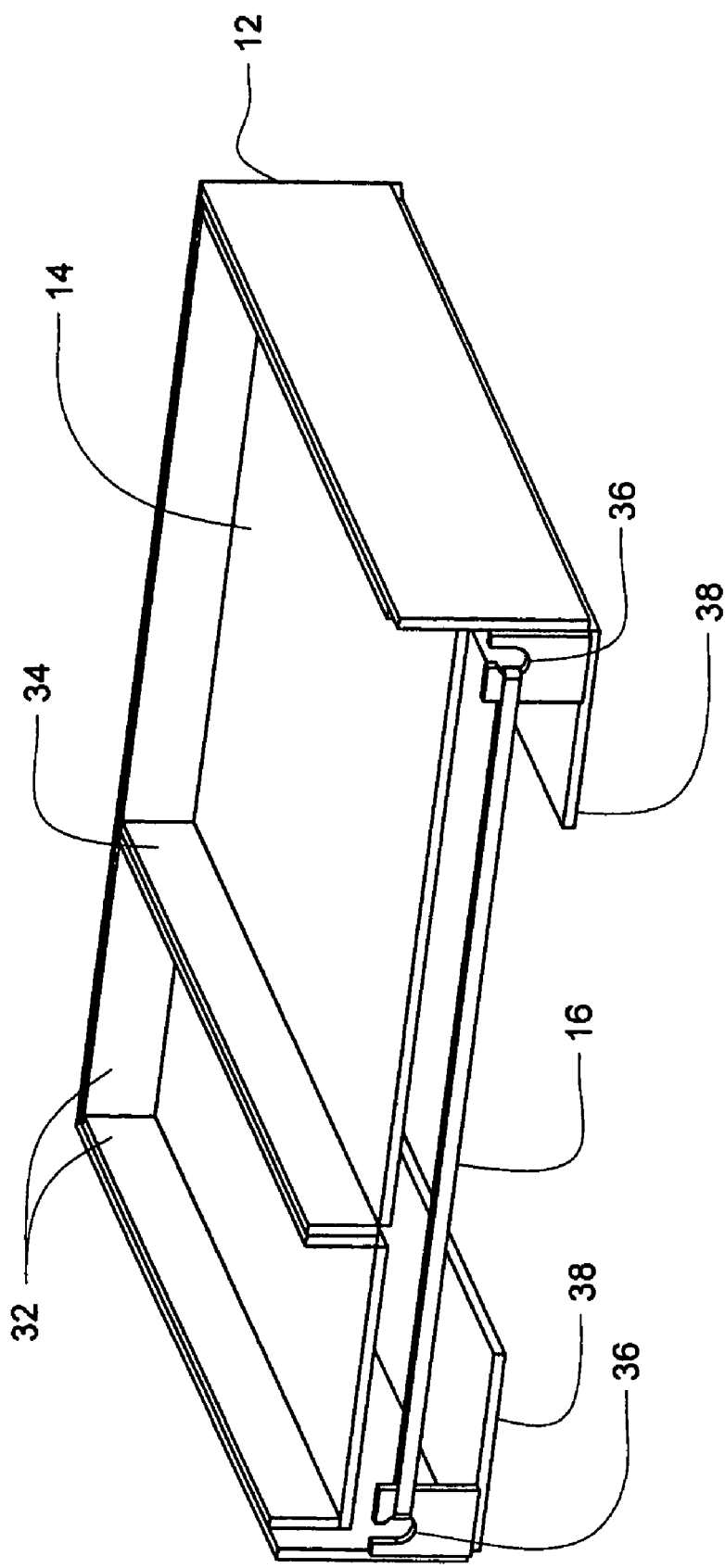
FIG. 5 is a pictorial view of the back of one embodiment of the present invention.

Referring now to FIG. 5, a rear view of the embodiment shown in FIG. 4 is shown. According to this embodiment the tray 14 is retained in the base 12 by flaps or additional layers of material forming a tray retaining ridge 32 that create a ridge to retain the tray 14. The tray 14 may be flat or scored in any location as shown in this FIG. 5 to create a partition for the segregation of items exhibited on the tray. Flaps 38 on the bottom of the base 12 may be provided to prevent the tray 14 from being removed from the computer. The apparatus is further fastened by means of a tension member 16 across the back of the base 12. The tension member 16 can be a rubber band as shown in this embodiment, which is connected to hooks 36 which are formed in the geometry of the base 12. However, in other embodiments, the tension member can be any material or design providing the desired tension to fasten the apparatus or retain the apparatus in its assembled state.

Figure 6:
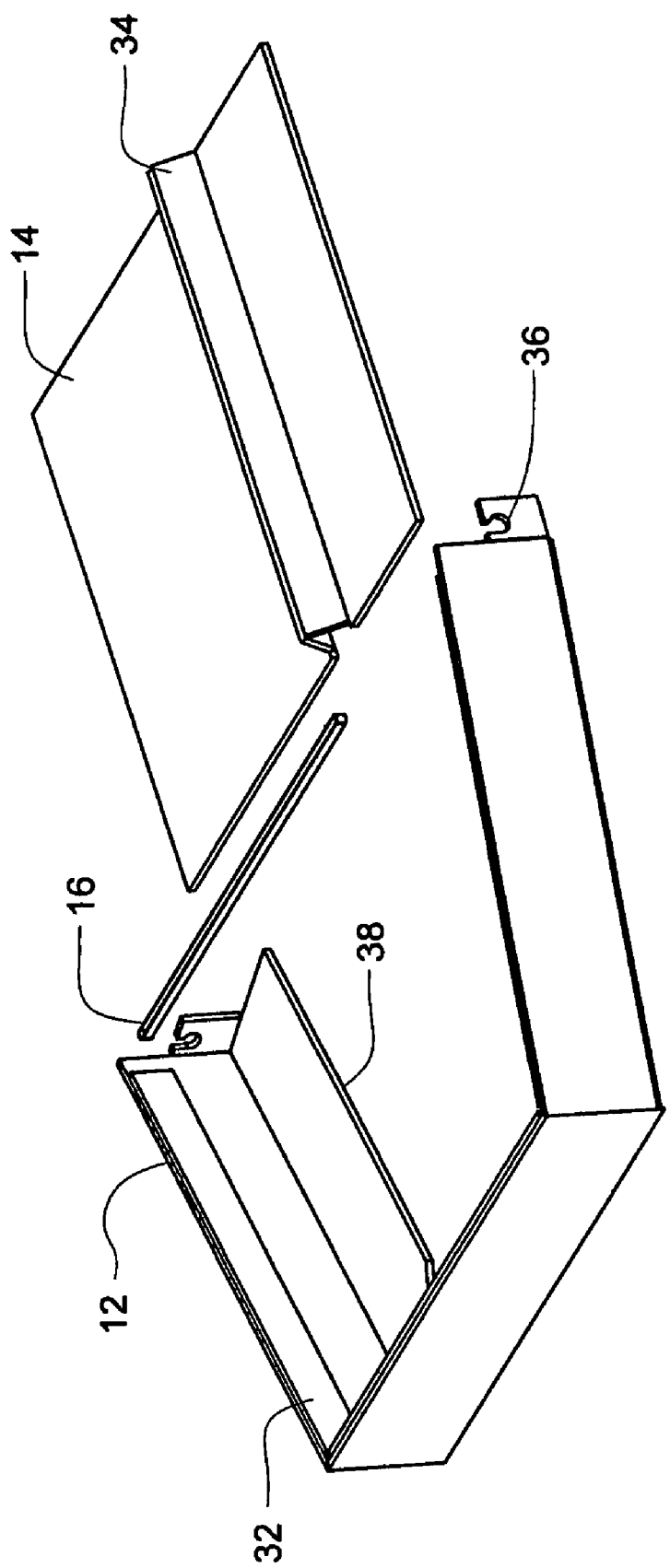
FIG. 6 shows one embodiment of the present invention partially disassembled.

Referring now to FIG. 6, an exploded view of the embodiment shown in FIG. 5 is shown. The tension member 16 that is assembled on the base 12 using hooks 36 is shown. The tray 14 is installed to conceal the computer controls or at least a portion of the notebook computer and can be used as a surface for the display or distribution of materials to be determined by an end user. The tray retaining ridge 32 on the base 12 is also shown. In this embodiment, the tray retaining ridge 32 retains the tray 14.

Figure 7A:
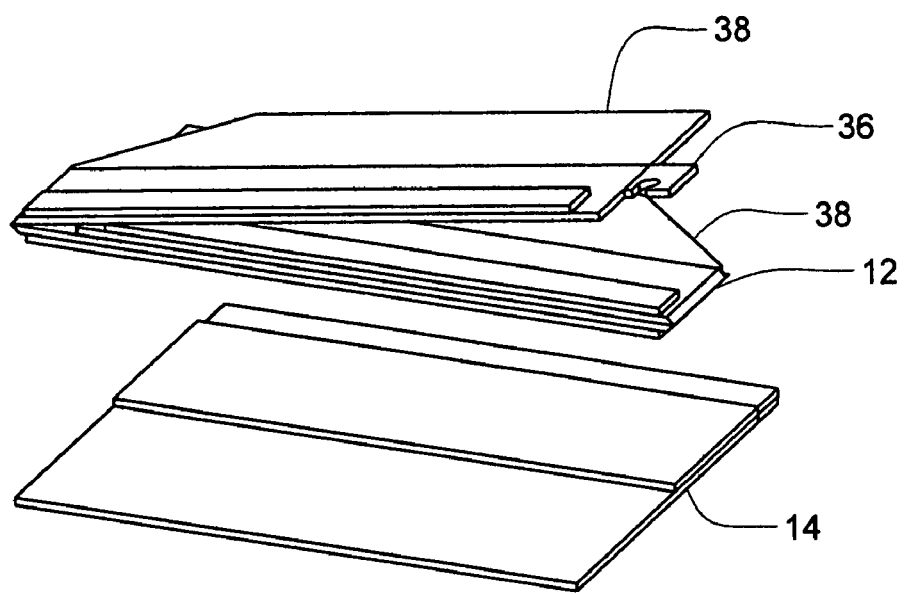
FIG. 7A is a pictorial view of one embodiment of the present invention in a disassembled and collapsed state.

Referring now to FIG. 7A, the embodiment shown in FIGS. 4-6 is shown in a partially folded/partially unfolded state to better show the collapsible nature of this embodiment. The base 12 is shown partially unfolded. The tension member, (not shown, shown in FIGS. 5-6 as 16), is removable and the hooks 36 unfold to align with the base 12 walls as do the bottom flaps 38. As described above, the bottom flaps 38, are not required but are present in some embodiments. The tray retaining ridge 32, in some embodiments, unfolds, but in other embodiments, the tray retaining ridge 32 remain laminated or folded against the shell wall.

Still referring to FIG. 7A, the tray 14 is shown in a folded state, exhibiting one means by which the tray may be folded for transportation, storage or other uses. The shell 12 is also shown in a partially folded state for transport or storage.

Figure 7B:
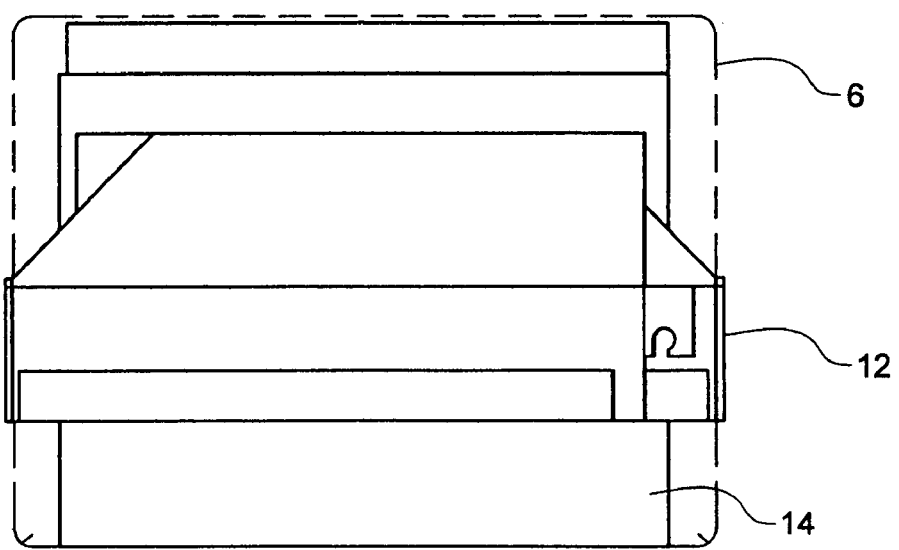
FIG. 7B is a top view of one embodiment of the present invention stacked on a closed notebook computer.

Referring now to FIG. 7B, the apparatus is shown according to the embodiment shown in FIGS. 4-6, folded and stacked along with a notebook computer 6. The base 12 is shown folded and the tray 14 is under the base 12 and on top of the notebook computer 6, shown in phantom lines. The apparatus does not need to be stacked in this order, but is shown this way for illustration purposes.

Figure 8C:
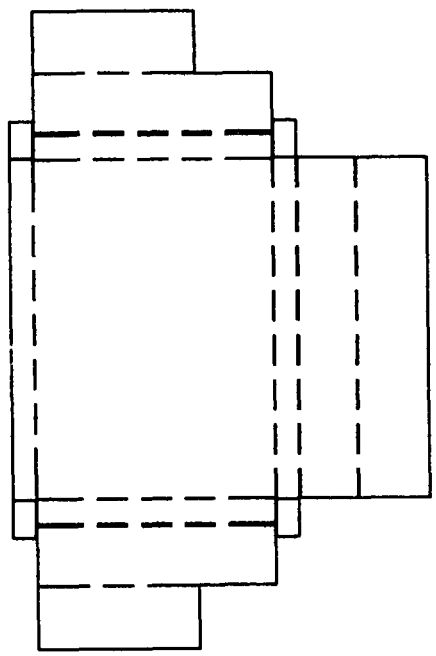
FIG. 8C is a representation of a flat pattern that may be folded to produce the form depicted in FIG. 8A.
Figure 8B:
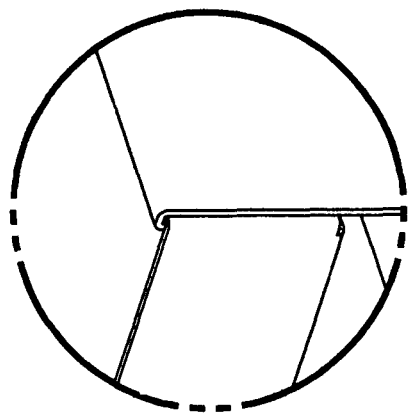
FIG. 8B is a close-up view of one area where material is folded in the embodiment shown in FIG. 8A.
Figure 8A:
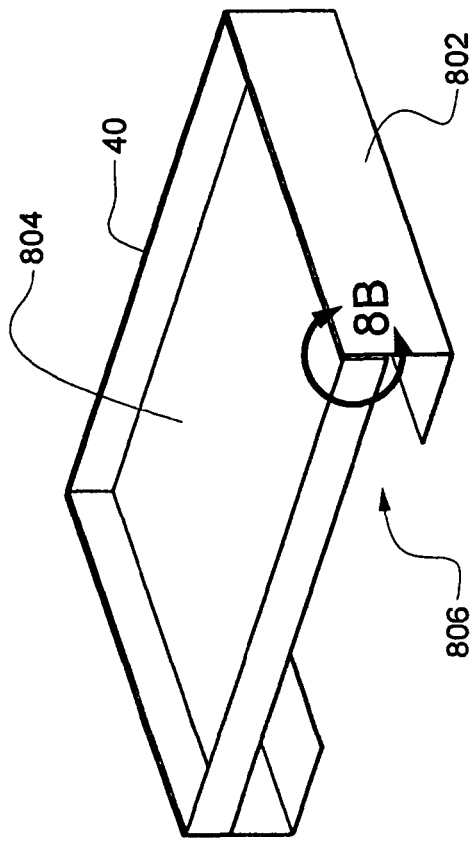
FIG. 8A shows an embodiment of the present invention that is formed by folding a single sheet of material.

Referring now to FIG. 8A another embodiment of the apparatus 40 is shown. This embodiment includes the base 802 and the tray 804 in one piece. An opening 806 in the base accommodates the non-monitor portion of a notebook computer. The apparatus 40 can collapse and be stacked with a notebook computer.

Referring now to FIG. 8B, a close-up view, is shown exhibiting the manner in which material may be folded to achieve the form of FIG. 8A.

Referring now to FIG. 8C, an unfolded top view of the embodiment shown in FIG. 8A is shown. The base and tray may be fully collapsed and stacked on top of a notebook computer.

Figure 8D:
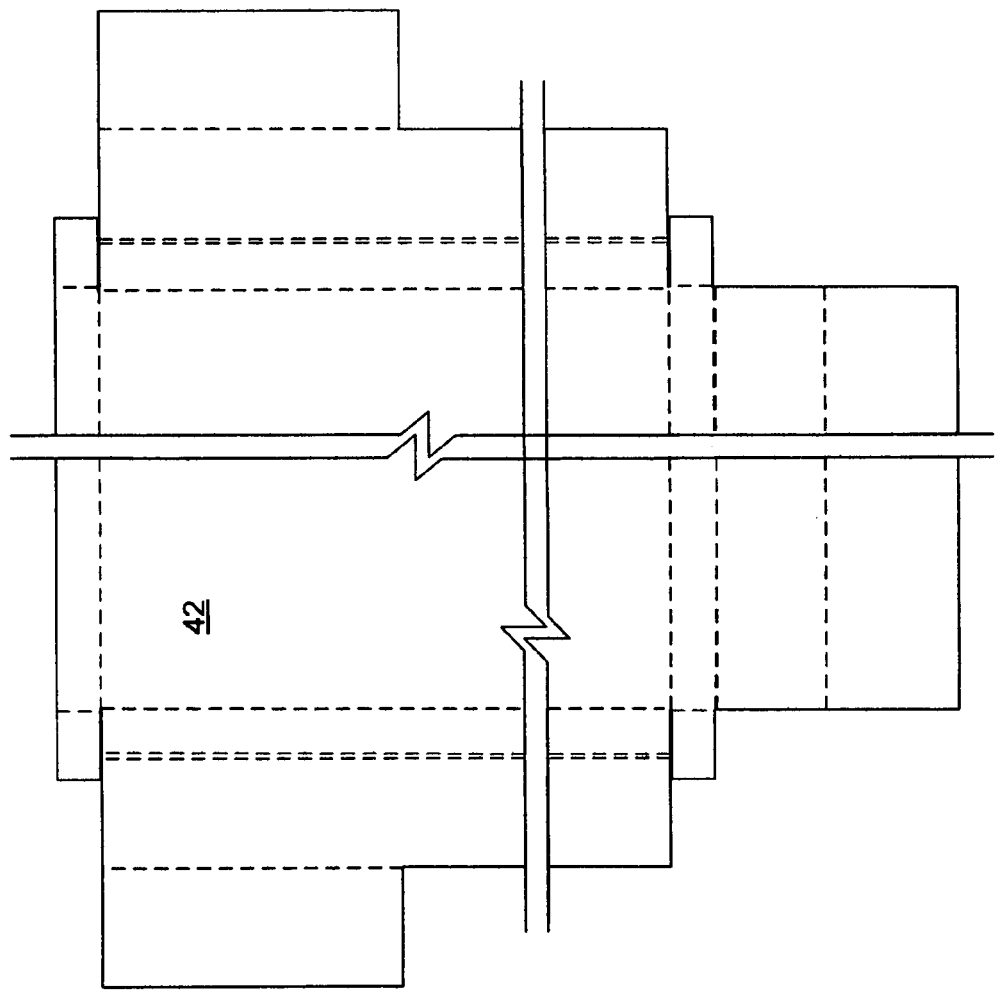
FIG. 8D represents a flat pattern for one embodiment of the apparatus in which the overall length and or width of the apparatus may vary.

Referring now to FIG. 8D, the flat pattern of the embodiment shown in FIG. 8A may be made with varying length or width to accommodate smaller or larger computers and or provide a smaller or larger tray area above the computer.

Figure 9B:
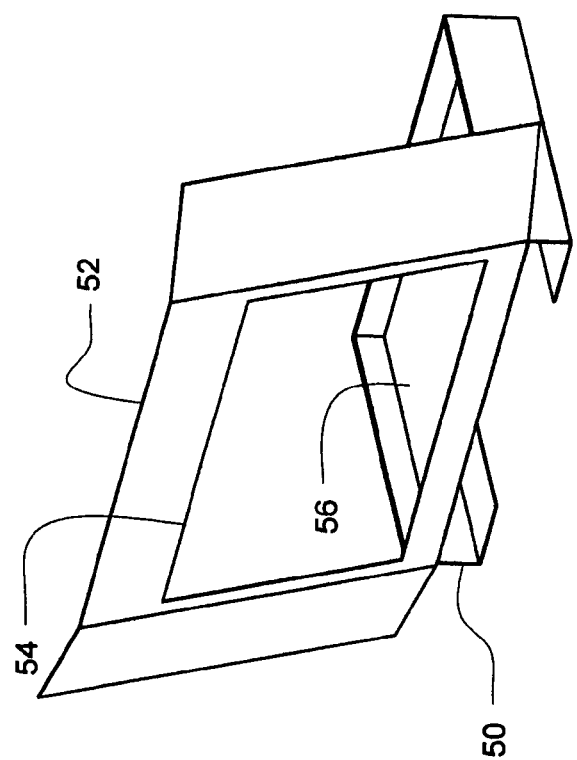
FIG. 9B is a back pictorial view of the present invention with a panel that surrounds the computer screen.
Figure 9A:
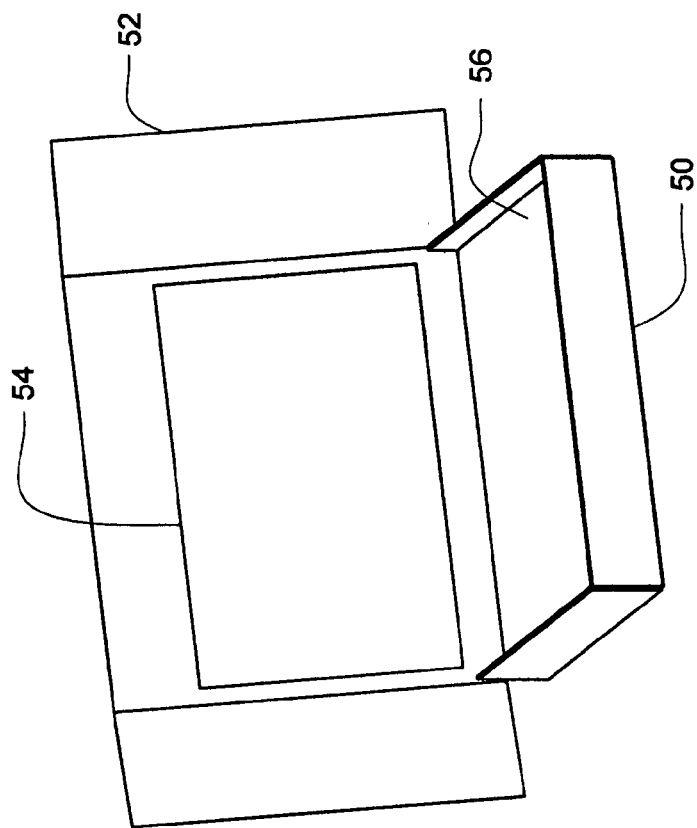
FIG. 9A shows an embodiment of the present invention with an additional panel that surrounds the computer screen where additional information or items may be displayed.

Referring now to FIGS. 9A and 9B, another embodiment of the apparatus is shown. In this embodiment, the base apparatus 50 includes a base and tray 56, in either a single portion or in separate pieces. However, in this embodiment, the base apparatus also includes a frame portion 52. The frame portion may be connected or attached to the base apparatus 50 or it may be a separate piece. The frame portion 52 provides an opening 54 for the monitor of a notebook computer. The frame 52 can be any size and in other embodiments, can be wider or narrower than shown and may be attached/connected or separate from the base apparatus.

Referring to FIG. 9B, the base apparatus 50 is shown from a rear perspective view. The tray 56 is visible through the computer screen opening 54. The frame 52 can be attached/connected to the base apparatus 50 or can be a separate portion and may attach/connect to the base apparatus 50 by any means. Alternately, the base 50 and frame 52 may not be attached or connected in any way and may be used either separately or in unison as desired by the user. In either embodiment, the frame 52 collapses to a flat portion and is stackable with the base apparatus 50.

Figure 9D:
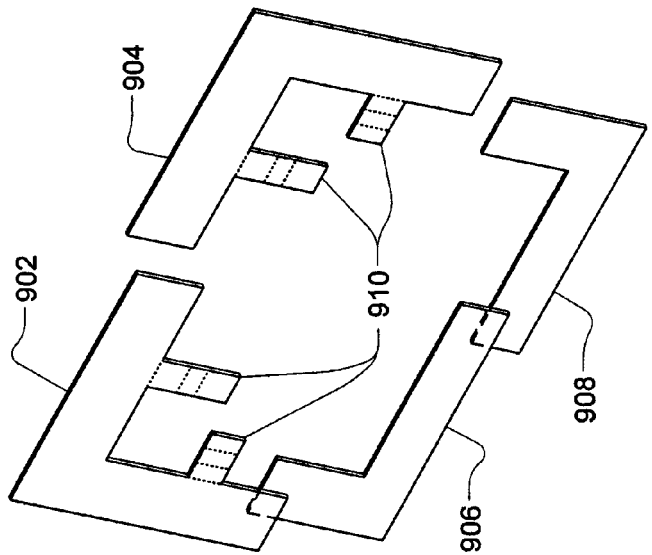
FIG. 9D shows the flat pattern of the screen surround shown in FIG. 9C.
Figure 9C:
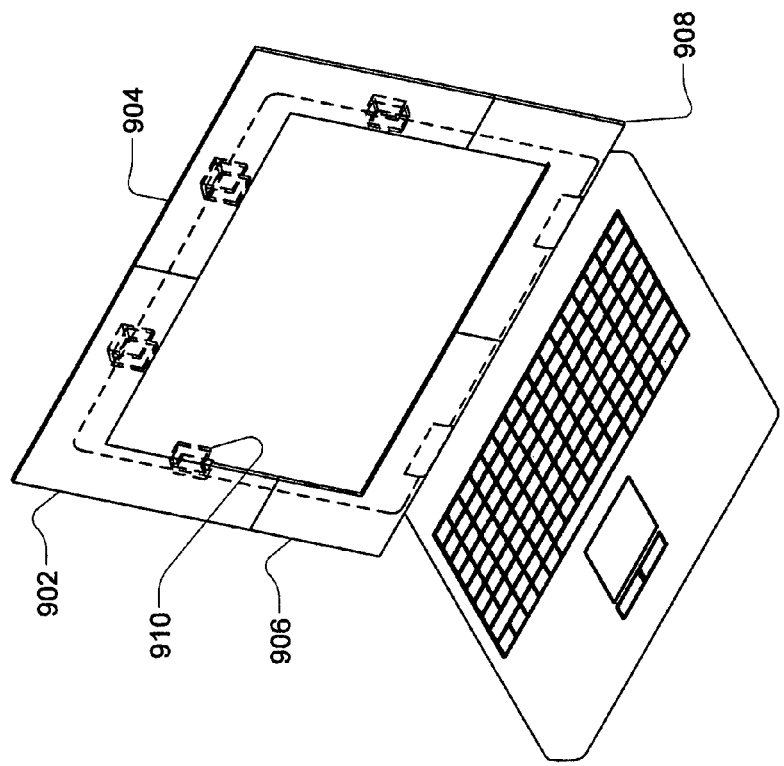
FIG. 9C shows one embodiment of a screen surround installed on a computer.

Referring now to FIG. 9C, a screen frame is shown installed on a computer. In this embodiment the frame is comprised of several pieces 902, 904, 906, 908 that may be assembled to accommodate various screen sizes. Pieces 902, 904, 906 and 908 may be joined by double sided adhesive, glue, tabs and slots or other fastening means commonly used in the art including but not limited to: a hook and loop fastening system, ties and slots, buttons and slots, and hooks and loops. For purposes of this description, the term "screen surround" is used interchangeably with the term "screen frame". The screen surround may be fastened to the computer by similar methods. Here the screen surround includes tabs 910 that may be folded to hang the screen surround on the computer screen perimeter.

Referring now to FIG. 9D, a flat pattern for items 902, 904, 906 and 908 is shown including tabs 910 that may be folded to position the screen surround on a computer screen. Items 902, 904, 906 and 908 may be made of any material substantially rigid to maintain its shape when placed in a vertical position as it will be presented on the computer screen. Candidate materials include but are not limited to heavy paper, fiber board, cardboard, sheet plastic, corrugated cardboard or corrugated plastic. Items 902, 904, 906 and 908 may be decorated by the user prior to or after assembly by means of hand decoration, laser, inkjet or other printing methods, decals or other means of decoration commonly used in the art.

Figure 10A:
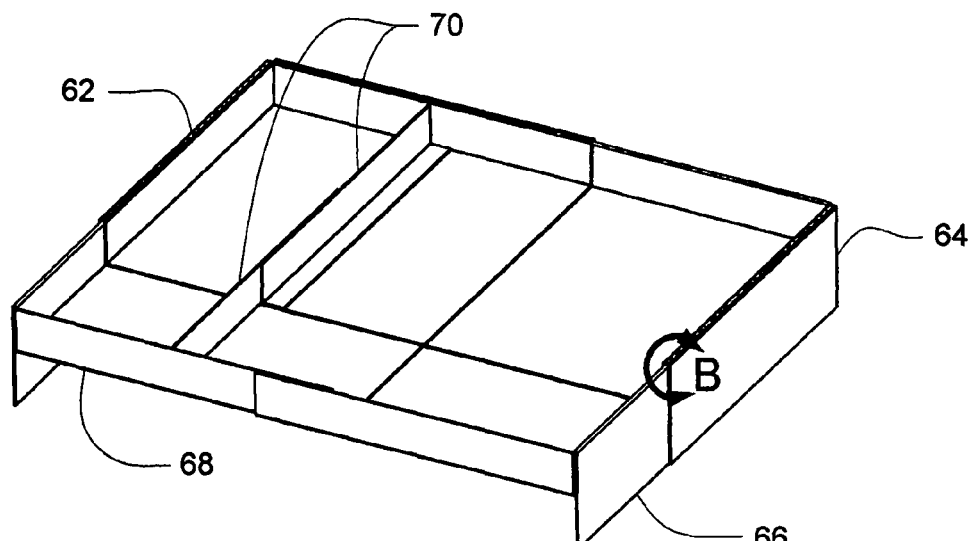
FIG. 10A is an embodiment that enables adjustment of the length and width of the tray area to accommodate computers of various sizes and display objects of various sizes.

Referring now to FIG. 10A, another embodiment of the apparatus is shown. In this embodiment, the apparatus includes a plurality of pieces, i.e., more than one. Here, four pieces 62, 64, 66, 68 are configured to facilitate adjustment of the length and width of the apparatus. More segments may be used to adjust other attributes such as wall height or the presence of partitions 70. The partition segments 70 may be located and fastened by double sided adhesive, tape, glue, hook and loop fasteners or other means commonly used in the art. Intermediate segments may be added to substantially increase the length or width of the base. Fewer segments may be sufficient for adjustability of fewer attributes such as the base length or width.

Figure 10B:
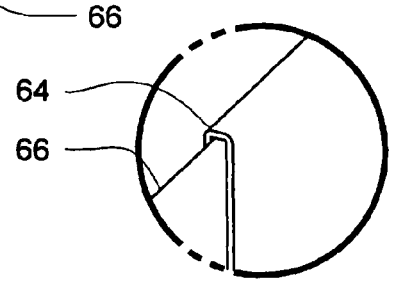
FIG. 10B shows a close-up view of the manner in which segments of the embodiment shown in FIG. 10A overlap to facilitate adjustability.

Referring now to FIG. 10B, a close-up view is shown, displaying the manner in which items 64 and 68 may overlap to join the components of the embodiment shown in FIG. 10A and provide for adjustability of the length of the apparatus. Similar overlapping may or may not occur at the interface of parts 62 and 64, 62 and 68, 68 and 66 as necessary to provide adjustability of the dimensions of the assembled apparatus. One or more partition segments 70 may be provided to segregate portions of the tray area upon assembly of the apparatus.

Figure 10C:
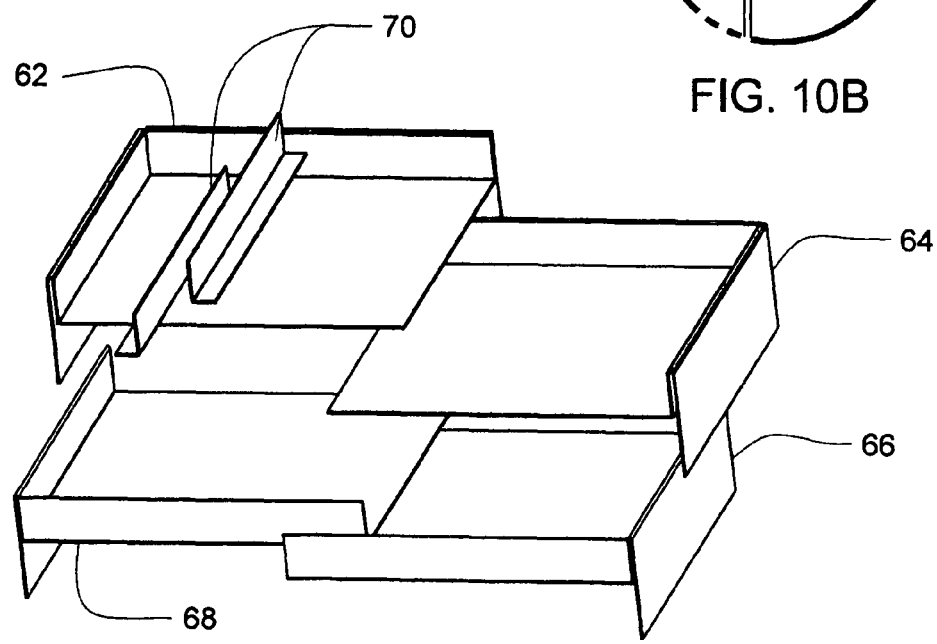
FIG. 10C is an exploded view of the embodiment shown in FIG. 10A exhibiting the manner in which a plurality of segments may be assembled to form an adjustable embodiment of the present invention

Referring now to FIG. 10C, the apparatus shown in FIG. 10A is shown disassembled. When assembled it may be held together by friction, tape, double sided tape, interlocking tabs and slots, adhesive, Velcro or other loop and hook mechanisms, or any other method of fastening or securing a plurality of panels as commonly known in the art.

Figure 10D:
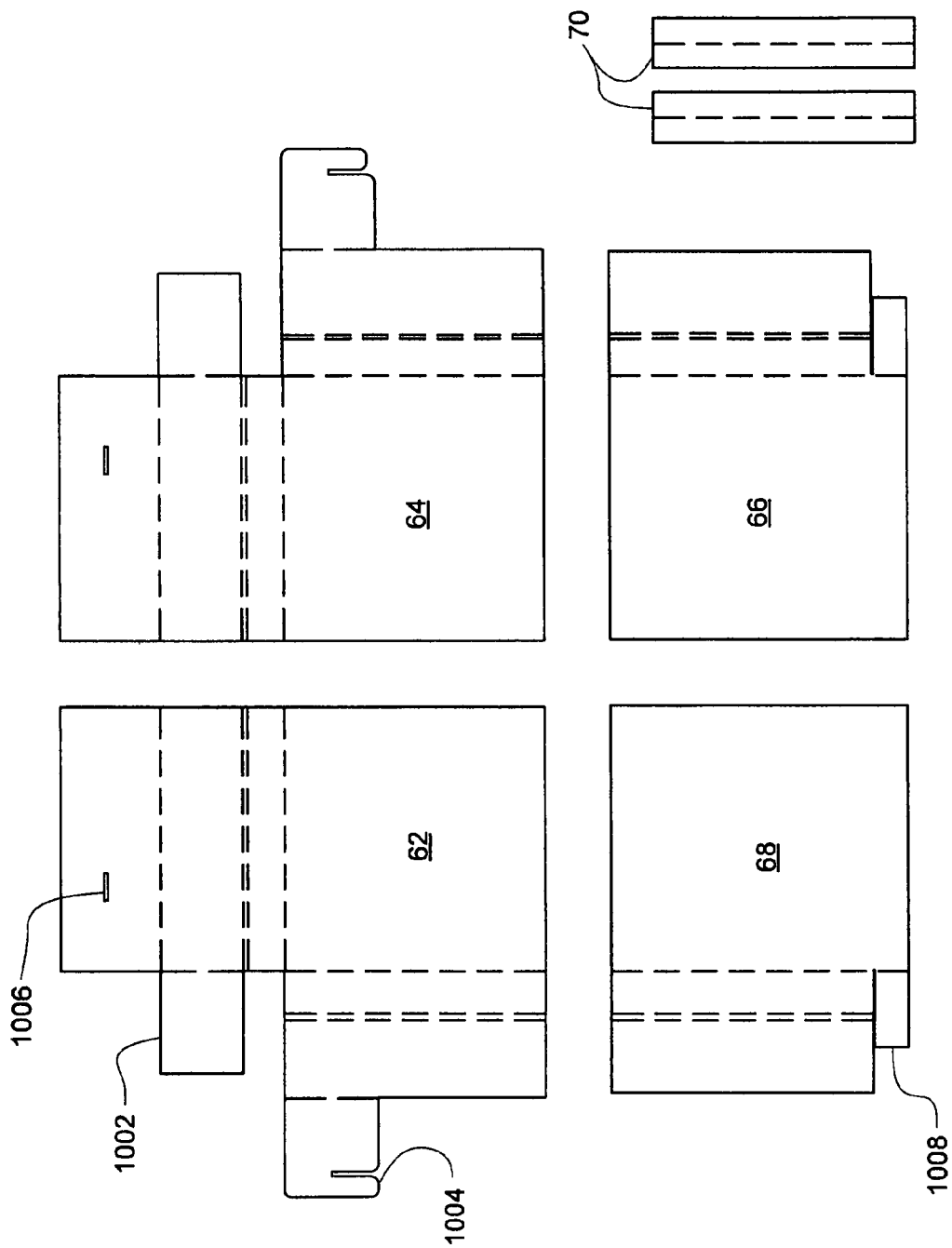
FIG. 10D is a flat pattern of the embodiment shown in FIG. 10A.

Referring now to FIG. 10D a flat pattern of the component pieces of the embodiment shown in FIG. 10A. Items 62 and 64 may be folded to create front portions of the apparatus and may include interlocking tabs such as items 1002 and 1004 to aid assembly and maintain the shape of the apparatus after folded. The apparatus may be fastened in a folded position by interlocking tabs and slots such as 1004 and 1006, glue, double sided tape, hook and loop fasteners, staples or other fastening means commonly used in the art. Interlocking tabs may be similar to those shown, arrow shaped, hook shaped or any tab and receptacle combination that serves to fasten the apparatus in the folded position. The fastening or joining means may be permanent or removable. Items 66 and 68 may be folded to create the rear portions of the apparatus. Items 66 and 68 may also include interlocking tabs and or features to facilitate alignment folding, assembly or fastening of the assembled apparatus.

Referring now to FIG. 10E, a bottom pictorial view of the embodiment shown in FIG. 10A is shown. Viewed from this angle, items 62, 64, 66 and 68 are visible from the bottom. The interlocking of tab 1004 with slot 1006 is also visible from this angle. It should be noted that many other tab and slot geometries are possible and it is also possible to assemble the apparatus with adhesive, double sided tape, hook and loop fastener or any fastening means commonly used in the art.

Referring now to FIG 10F, one possible embodiment of a tab 1010 is shown to facilitate alignment and assembly of the apparatus.

The frame embodiment can be added to any of the apparatus embodiments described above. As described above, the apparatus has many embodiments. The apparatus can be a single body or at least two parts. The apparatus can be any dimensions. The monitor frame can also be any dimensions, and can be either sized so that the apparatus and the frame are the same width, or that the frame extends past the width of the apparatus. The apparatus, in the preferred embodiment, is collapsible, but in other embodiments, is not collapsible. As described above, a number of embodiments of the tray are possible, and only exemplary embodiments are shown and described herein, but other features are possible and contemplated for this apparatus.

In practice, the apparatus accommodates the bottom (i.e., non-monitor half) of a notebook computer. The top portion includes either partitions or features to aid in the display of any type of item desired. If the frame embodiment is used, the frame is positioned so that it surrounds the perimeter monitor portion of the notebook computer so that the monitor is visible to a user. The monitor is therefore the only portion of the notebook computer that is visible in this embodiment. Where the frame embodiment of the apparatus is not used, the notebook computer frame is also visible to a user.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

The invention claimed is:

1. An apparatus comprising:
 a base comprising at least two sections and having a size and shape to accommodate at least a portion of a notebook computer, said base comprising:
  a housing having at least three sides; and
  a top portion attached to said at least three sided housing, wherein said at least three sides and said top portion form a compartment and wherein said compartment accommodates only a non-monitor portion of said notebook computer.

2. The apparatus of claim 1 wherein said base is collapsible.

3. The apparatus of claim 1 wherein said base is foldable.

4. The apparatus of claim 1 wherein said base size and, or shape is adjustable.

5. The apparatus of claim 1 wherein said base comprising at least one section.

6. The apparatus of claim 1 wherein said apparatus further comprising a frame portion connected to said base, said frame portion having a predetermined size and, or shape so as to accommodate and frame a monitor of a notebook computer, wherein said frame portion having at least one section.

7. The apparatus of claim 6 wherein said frame portion comprising at least two portions.

8. The apparatus of claim 7 wherein said at least two portions connect to one another so as to form said frame portion, wherein said at least two portions further comprising at least two connecting points whereby the size of said frame portion is adjustable.

9. The apparatus of claim 1 wherein said base further comprising a top tray portion.

10. The apparatus of claim 9 wherein said top tray portion further comprising at least one dividing feature.

11. The apparatus of claim 10 wherein said at least one dividing feature is moveable.

12. An apparatus comprising:
 a base having at least one section, said base having a size and shape to accommodate at least a portion of a notebook computer said base comprising:
  a housing having at least three sides;
  a top portion attached to said at least three sided housing, wherein said at least three sides and said top portion form a compartment and wherein said compartment accommodates only a non-monitor portion of said notebook computer; and
  a top tray portion comprising at least one dividing feature; and
 a frame portion connected to said base whereby said frame portion accommodates and frames at least a portion of a monitor of a notebook computer, wherein said frame portion having at least one section.

13. The apparatus of claim 12 wherein said base and said frame portion are collapsible.

14. The apparatus of claim 12 wherein said base and said frame portion are foldable.

15. The apparatus of claim 12 wherein said base comprising at least two sections.

16. The apparatus of claim 12 wherein said frame portion comprising at least two portions.

17. The apparatus of claim 16 wherein said at least two portions connect to one another so as to form said frame portion, wherein said at least two portions further comprising at least two connecting points whereby the size and, or shape of said frame portion is adjustable.

18. The apparatus of claim 12 wherein said at least one dividing feature is moveable.

* * * * *